United States Patent [19]

Hirai et al.

[11] 3,885,060

[45] May 20, 1975

[54] PRODUCTION OF INSOLUBILIZED ORGANIC POLYMERS

[75] Inventors: Takako Hirai, Kodaira; Yoshio Hatano, Uenoharamachi; Saburo Nonogaki, Tokyo; Teruaki Kobayashi, Hachioji, all of Japan

[73] Assignee: Hitachi, Ltd., Japan

[22] Filed: Nov. 29, 1972

[21] Appl. No.: 310,583

Related U.S. Application Data

[63] Continuation-in-part of Ser. No. 852,234, Aug. 22, 1969, abandoned.

[30] Foreign Application Priority Data

Aug. 23, 1968 Japan ................................ 43-59886

[52] U.S. Cl. .............. 427/43; 96/35.1; 204/159.22; 260/837 R; 156/2

[51] Int. Cl. ....... B44d 1/50; C08f 3/16; C08g 30/10

[58] Field of Search............... 117/93.31, 161 ZB, 8; 96/115 R, 115 P, 35.1; 260/837 R, 94.7 A, 88.3 A; 204/159.22

[56] References Cited

UNITED STATES PATENTS

| | | | |
|---|---|---|---|
| 3,253,000 | 5/1966 | Kirchhof et al. | 260/94.7 A |
| 3,291,600 | 12/1966 | Nicoll | 117/93.31 |
| 3,361,842 | 1/1968 | Applegath et al. | 117/93.31 |
| 3,374,111 | 3/1968 | Brennemann | 117/93.31 |
| 3,406,040 | 10/1968 | DaSilva et al. | 117/93.31 |
| 3,417,069 | 12/1968 | Davis et al. | 260/94.7 A |
| 3,501,389 | 3/1970 | Spooncer et al. | 260/88.3 A |
| 3,531,547 | 9/1970 | Hazen et al. | 117/93.31 |
| 3,535,137 | 10/1970 | Haller et al. | 117/93.31 |

*Primary Examiner*—William D. Martin
*Assistant Examiner*—John H. Newsome
*Attorney, Agent, or Firm*—Craig & Antonelli

[57] ABSTRACT

Organic polymer compositions containing epoxy groups in the main chain or sub-chain or both thereof, for example, polyglycidyl methacrylate, have excellent cathode ray-sensitive properties, and provide insolubilized films suitably used as a resist composition in place of a photoresist composition and as a memory medium for a high density memory.

34 Claims, 8 Drawing Figures

PRODUCTION OF INSOLUBILIZED ORGANIC POLYMERS

CROSS REFERENCE TO RELATED APPLICATION:

This application is a continuation-in-part of application Ser. No. 852,234 filed Aug. 22, 1969, now abandoned.

BACKGROUND OF THE INVENTION

This invention relates to insolubilized films of organic polymers. More particularly, this invention concerns films of organic polymers having epoxy groups in the polymer chains which are insolubilized by exposure to a cathode ray in a pattern.

It is well known to use light-sensitive polymers such as KPR and KMER (trademarks for a product of Eastman Kodak Co.) for photoresist materials. In this case, a resist image is formed to protect the surface of support from the attack by an etching solvent, sand blast or the like. Light-sensitive polymers are also used in photomechanical reproduction in order to produce resist images for preparing printing plates.

Photoresists are most frequently utilized in the semiconductor industry. That is, for example, in case of doping (or diffusing) an impurity on the desired portion of semiconductor substrate, $SiO_2$ film (as a mask) usually is formed selectively on the surface of this substrate. Such a mask of $SiO_2$ film is formed on the surface of substrate, and photoresist composition is painted thereon to form another film. By forming a desired mask on this film surface, exposing the masked film to light and developing the same, photoresist image is produced. By using the thus produced photoresist image as a mask and etching the portion of $SiO_2$ film not hidden by the mask, holes of the desired pattern can be made in the homogeneously formed $SiO_2$ film, and $SiO_2$ film can selectively be formed on the surface of semiconductor substrate.

That is, photoresist is used as a means of maskinig in the case of making a hole of desired pattern in $SiO_2$ film. The semiconductor device, as mentioned above, is produced by making a hole for doping an impurity in the $SiO_2$ film formed on the surface of the semiconductor substrate and doping an impurity into the substrate through this hole. The electric properties of the semiconductor device depends on the precision of the holing process, that is, the precisions of making a hole in photoresist film, of a mask of the desired pattern used in this case and of forming such a film on photoresist film.

Conventionally, by painting KPR or KMR (trademarks of products of Eastman Kodak Co.), as the said resist film, on $SiO_2$ film and forming a mask of desired pattern on the resist film, and exposing it to ultraviolet irradiation, an optically sensitized photoresist image was produced. Further, by using the thus produced photoresist image as a mask and etchng the $SiO_2$ film by chemical means, a hole was made in the $SiO_2$ film.

Conventional photosensitive polymeric systems used as photoresists are primarily sensitive to ultraviolet radiation and to the very short wavelengths of the visible spectrum. These conventional methods include such defects as the precision of processing a phtoresist film being unable to be improved to the extent of higher than the wavelength of light, a high precision mask to be used for the exposure being hardly obtainable and the advanced technique being required for the procedure of placing a mask.

Recently, the development of, so to speak, integrated circuit (IC) which is an active element wherein complicated circuit is assembled in a semiconductor substrate has been achieved through an emergent procedure and thus the semiconductor industrial field requires an extremely precise holing operation. Thus, a method of directly producing the desired resist image without using a mask by scanning a cathode ray instead of such optical radiation as ultraviolet has been proposed.

As is already known, since the wavelength of a cathode ray in comparison to that of ultraviolet is short enough, the precision of sensitizing a resist material is high. Further since the intensity, width etc. of cathode ray irradiation can easily be controlled, the position which the cathode ray is applied to can precisely be controlled. By utilizing this advantage, the problems associated with making the above prior art semiconductor element can be minimized and the improvement of frequency characteristics of the semiconductor element and the increasing of integrated density can be realized.

However, conventional light-sensitive material is sensitized mainly by ultraviolet and not so much by a cathode ray. Actually usable cathode ray-sensitive materials have not been obtained so far.

BRIEF SUMMARY OF THE INVENTION

An object of the present invention is to provide insolubilized parts of films of a highly cathode ray-sensitive synthetic organic polymer.

Another object of the present invention is to provide a new and greatly improved resist material suitable for the production of semiconductors.

Further objects of the present invention will become apparent from the following detailed explanation and drawings showing preferred embodiments of the present invention.

The present inventors have discovered that the above-mentioned and other objects of the present invention can be realized by the use of a cathode ray sensitive material which essentially comprises an organic polymer containing vicinal epoxy groups in the chain thereof and said polymer having a structural unit of a member selected from the group consisting of the following formulas:

(1)

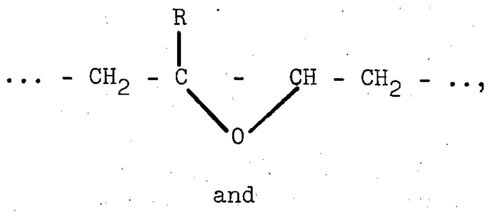

and (2)

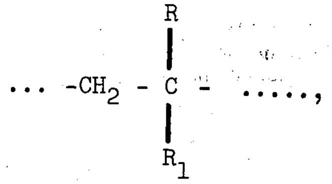

wherein R represents a member selected from the class consisting of a hydrogen atom, a methyl group and a chlorine atom; and $R_1$ represents an epoxy-containing member selected from the class consisting of the following six groups;

(a) 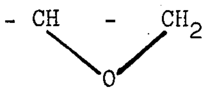

(b) 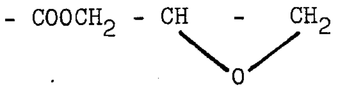

(c) 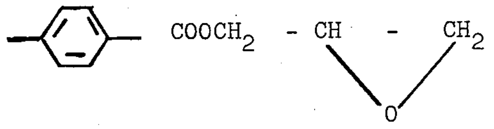

(d) 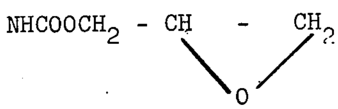

(e) 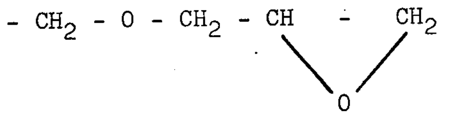, and (f) 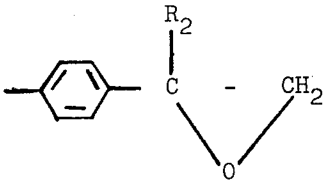

wherein $R_2$ represents a member selected from the class consisting of a hydrogen atom and a methyl group.

The typical organic polymers represented by formulas (1) and (2) are the following:

A. As the polymer represented by formula (1), there is exemplified an epoxy polymer prepared by epoxidizing the double bonds of 1,4-polybutadiene represented by the following formula:

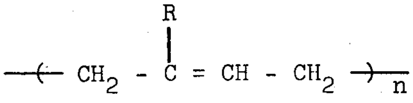

(11)

wherein R is a hydrogen atom, a methyl group or a chlorine atom, by such an oxidizing agent as an organic peroxide.

B. As the polymer represented by formula (2), there is exemplified epoxy polymers prepared by epoxidizing the double bond of 1,2-polybutadiene represented by the following formula:

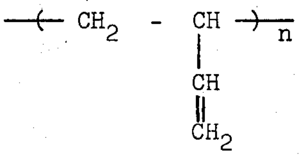

(21)

with such an oxidizing agent as an organic peroxide, or by homo-polymerizing at the vinyl group of vinyl compounds having epoxy groups represented by the following formulas:

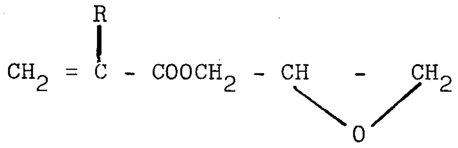

(22)

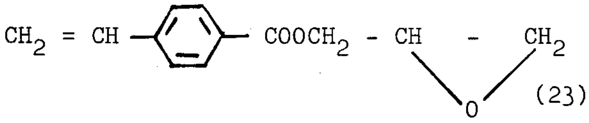

(23)

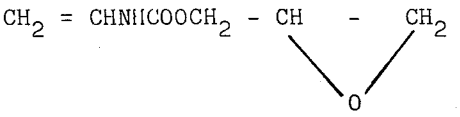

(24)

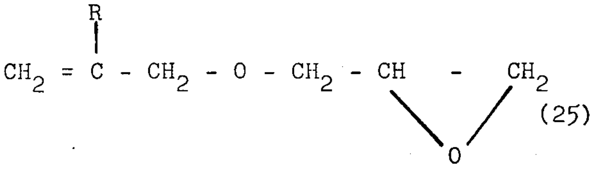

(25)

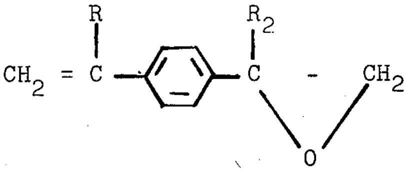

(26)

wherein R is a hydrogen atom, a methyl group or a chlorine atom and $R_2$ is a hydrogen atom or a methyl group; copolymerizing at least two of the said vinyl compounds; or copolymerizing said vinyl compound with other vinyl compounds without an epoxy group such as acrylonitrile, methacrylonitrile, and styrene, in amounts less than 50 mole percent.

Examples of polymers prepared from the monomers represented by these formulas are epoxidized 1,4-polybutadiene, epoxidized 1,4-polyisoprene and epoxidized 1,4-polychloroprene regarding formula (11); and epoxidized 1,2-polybutadiene regarding formula (21). Further, when R of formula (22) is a methyl group, the vinyl compound of the formula is glycidyl methacrylate, and when R is hydrogen atom, the vinyl compound is glycidyl acrylate. The homopolymers of these compounds are polyglycidyl methacrylate and polyglycidyl acrylate. Further, the copolymers of these vinyl compounds with acrylonitrile or methacrylonitrile include, for example, glycidyl methacrylate-acrylonitrile copolymere and glycidyl acrylate-acrylonitrile copolymer.

The sensitivity to cathode ray increases in proportion to the increase of molecular weight while the increase of molecular weight reduces the ability of resolution and deteriorates the homogeneous coating. Thus, the molecular weight of epoxy polymer should be in the range of 100,000 to 10,000,000, more preferably in the range of 300,000 to 2,000,000.

When the molecular weight is lower than 100,000 the sensitivity to a cathode ray and the strength of the film are both insufficient for resist and other desired applications; whereas when the molecular weight is higher than 2,000,000 the polymer is chemically unstable and spontaneous curing tends to occur.

An epoxy polymer of lower molecular weight after being dissolved and painted may be subjected to heat treatment so as to increase its molecular weight within the desired range and the polymer with the thus increased molecular weight can be used.

The above-mentioned epoxidized 1,4-polybutadiene, epoxidized 1,4-polyisoprene, epoxidized 1,4-polychloroprene and epoxidized 1,2-polybutadiene are explained in more detail below. These polymers have preferably a molecular weight of 100,000 to 2,000,000, and the proportion of the double bonds epoxidized ranges from 8 to 70%, and more preferably from 25 to 63%. When the proportion is less than 8%, the sensitivity to cathode ray is too low, while at a proportion of more than 70%, the polymer is chemically unstable and becomes cured upon standing without exposure to a cathode ray (this is known as spontaneous insolubilization).

It will be understood that the cathode ray sensitivity of the epoxy-containing polymers is dependent on the degree of epoxidation, i.e. the higher the degree of epoxidation the more sensitive the polymer. Therefore, for most applications where well defined insolubilized portions are to be obtained at lower charge density of the cathode ray without self-curing, the degree of epoxidation is from about 25 to about 63%.

A cathode ray-sensitive material of the present invention composed of epoxy polymer is excellent in sensitivity and adherence to the support and easily forms a coated film. Thus, by irradiating a narrow cathode ray beam, a resist image of the desired pattern can be produced without using a mask. Accordingly, the present cathode-ray-sensitive composition not only can be used as the resist material in the semiconductor industry in place of that in the conventional photographic etching method, but also as a high density memory medium of high molecular unit in the memory field for information.

The procedure for producing the preferred epoxy-containing polymer, i.e. epoxidized 1,4-polybutadiene are as follows:

Epoxidized 1,4-polybutadiene can be prepared by polymerizing monomeric butadiene in a known manner to synthesize 1,4-polybutadiene and then epoxidizing the double bonds of the polymer with a peroxide, for example, peracetic acid, as shown in the following reaction formulas:

Butadiene: $CH_2=CH-CH=CH_2$ 1,4-Polybutadiene: $-\!\!\left( CH_2-CH=CH-CH_2 \right)\!\!-_n$ (homopolymer of butadiene)

When the molecular weight of the polymer is 100,000 to 2,000,000, *n* is about 1,900 to 38,000.

Epoxidation: For instance, peracetic acid ($CH_3COOOH$) is added to the 1,4-polybutadiene to effect reaction, whereby the double bonds of the polymer are easily epoxidized.

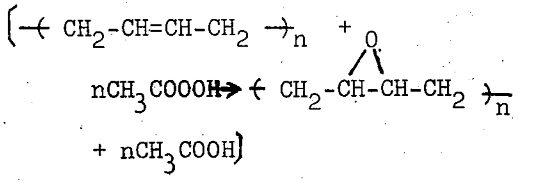

Epoxidized 1,4-polybutadiene:

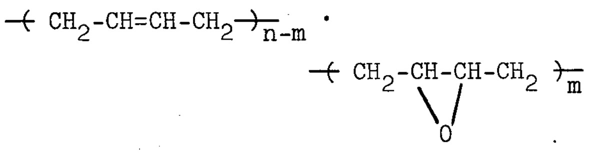

wherein *m* represents the number of moles of epoxidized double bonds. Therefore, $m = 0$ means that no epoxidation is effected, and $m = n$ means that all the double bonds of the 1,4-polybutadiene are epoxidized. Thus the term "degree of epoxidation" refers to $m/n \times 100$ (%).

On the other hand, a polyglycidyl methacrylate polymer may be produced in the following manner:

The polyglycidyl methacrylate is a homopolymer obtained by homo-polymerizing glycidyl methacrylate, and has the following structure:

Glycidyl methacrylate:

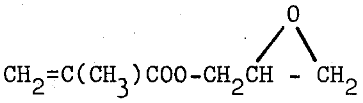

Polymerized with a conventional initiator

Polyglycidyl methacrylate:

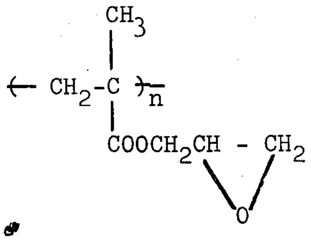

in which *n* is about 7,000 to 14,000 when the molecular weight is 100,000 to 2,000,000.

The polyglycidyl methacrylate has epoxy groups in number corresponding to the value of *n*, and hence, if the molecular weight is defined, the number of epoxy groups is uniquely determined. Since the number of epoxy groups is proportional to molecular weight, the degree of epoxidation remains constant. In this case, the polymer is a homopolymer of monomer containing epoxy group, and hence, the degree of epoxidation is 100%. In the case of polyglycidyl acrylate, quite the same is applicable. That is to say, Glycidyl acrylate:

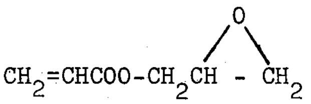

Polyglycidyl acrylate:

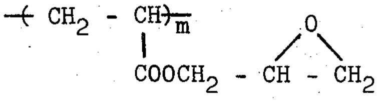

(Homopolymer of glycidyl acrylate)

Molecular weight: 100,000 to 2,000,000 (*n* corresponds to 7,000 to 14,000)

Concerning copolymer consisting of glycidyl monomer and vinyl monomer (not containing epoxy group):

Glycidyl methacrylate-acrylonitrile copolymer

This copolymer is prepared by copolymerizing glycidyl methacrylate monomer and acrylonitrile monomer in a known manner, and has the following structure:

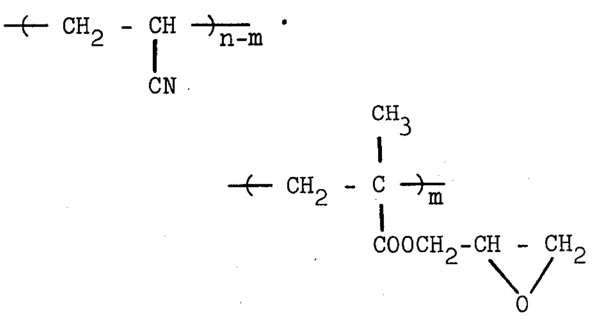

(Acrylonitrile unit) (Glycidyl methacrylate unit) Said copolymer has a molecular weight of 100,000 to 2,000,000 and the degree of epoxidation thereof is reresented by the formula, $m/n \times 100$. In this invention, as mentioned above, $50\% \leq m/n \times 100 < 100\%$. When $m$ equals $n$, the degree of epoxidation becomes 100%, and this case corresponds to the above polyglycidyl methacrylate.

Glycidyl acrylate-acrylonitrile copolymer

This copolymer is prepared by copolymerizing glycidyl acrylate and acrylonitrile in a known manner, and has the following structure:

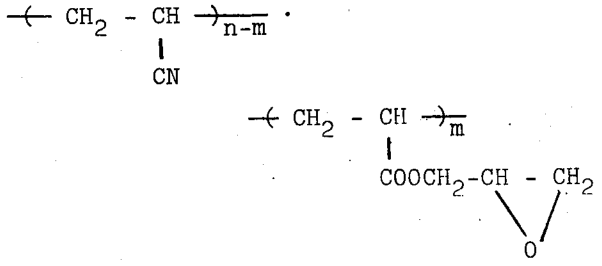

(Acrylonitrile unit) (Glycidyl acrylate unit) Said copolymer has a molecular weight of 100,000 to 2,000,000, and the degree of epoxidation thereof is represented by the formula, $m/n \times 100$, and $50\% \leq m/n \times 100 < 100\%$. When m equals $n$, the degree of epoxidation becomes 100%, and this case corresponds to the above polyglycidyl acrylate.

In addition to the above-mentioned copolymers, there may be used glycidyl methacrylate-methacrylonitrile copolymer; glycidyl acrylate-methacrylonitrile copolymer; glycidyl acrylate-styrene copolymer and glycidyl methacrylate-styrene copolymer. The molecular weight and degree of epoxidation of these copolymers can be defined in quite the same manner as above.

BRIEF DESCRIPTION OF THE DRAWINGS

FIG. 1 is a comparative example which shows polyglycidyl methacrylate

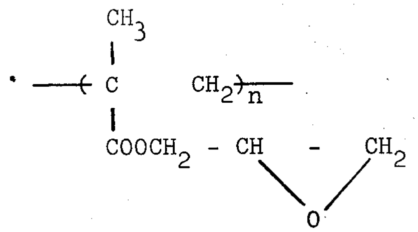

having a structure wherein the ethyl group in the sub-chain of ethyl polymethacrylate

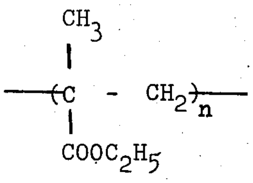

is replaced by an epoxy group. The curve 1 shows the characteristics of polymer without epoxy groups and curve 2 shows those of polymer with epoxy groups. The molecular weights of both polymers are about 1,700,000. As is clear from the figure, curve 2 has a sensitivity for cathode ray $10^5$ times as sensitive as that of curve 1, and thus the effect thereof is extremely remarkable.

Figure 1:
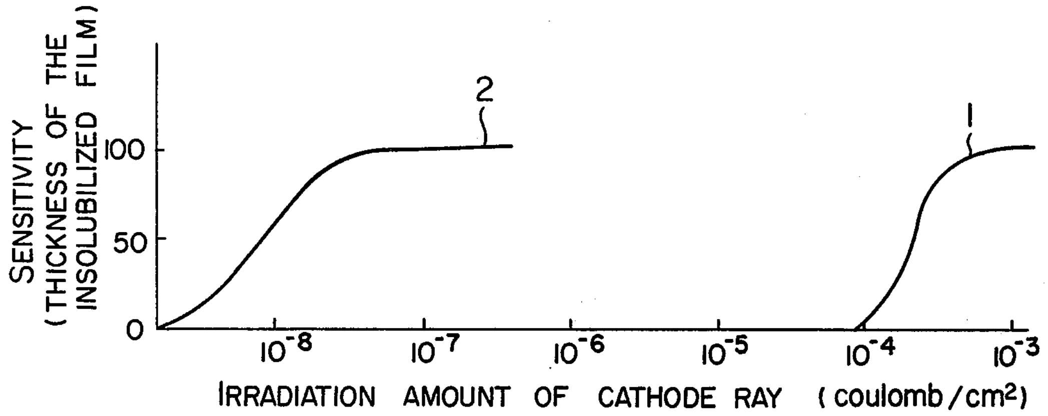
FIGS. 1, 2 and 3 are individually a figure for reference, which may describe the present invention. They show characteristic curves showing the change of sensitivity against the amount of cathode ray irradiation in the case of introducing the epoxy group. Axis of ordinates of these figures shows sensitivity of polymer against cathode ray irradiation, represented by the thickness of polymer film insolubilized in a solvent by the irradiation of cathode ray. That is, the sensitivity is represented by a relative value of the thickness of resist film (cured film) remaining after the developing treatment of washing the film with the solvent after the cathode ray irradiation, in the case of the thickness of polymer coating prior to the irradiation being specified as 100, which is calibrated arbitrary. Axis of abscissa represents the amount of cathode ray irradiation (coulomb/$cm^2$).
Figure 2:
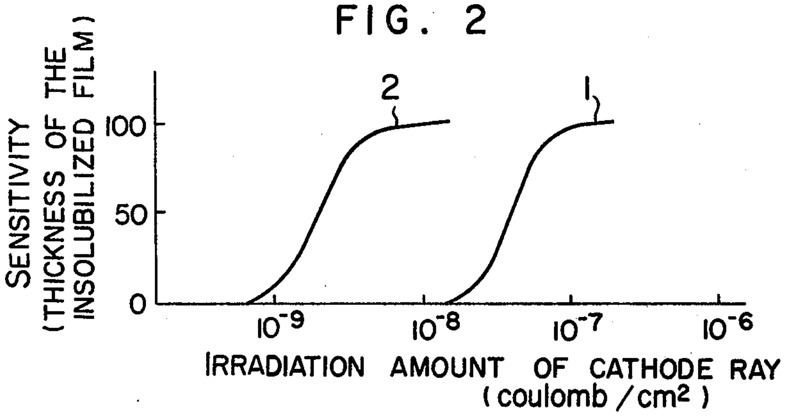

FIG. 2 is an example which shows the case of

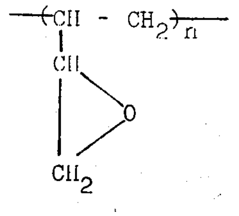

prepared by epoxidizing about one-third of the double bond content of the sub-chains of 1,2-polybutadiene

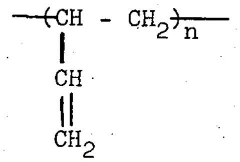

Curve 1 shows the characteristics of the comparative material not epoxidized, and curve 2 shows those of the material epoxidized of the present invention. The molecular weights of both materials are about 300,000.

Figure 3:
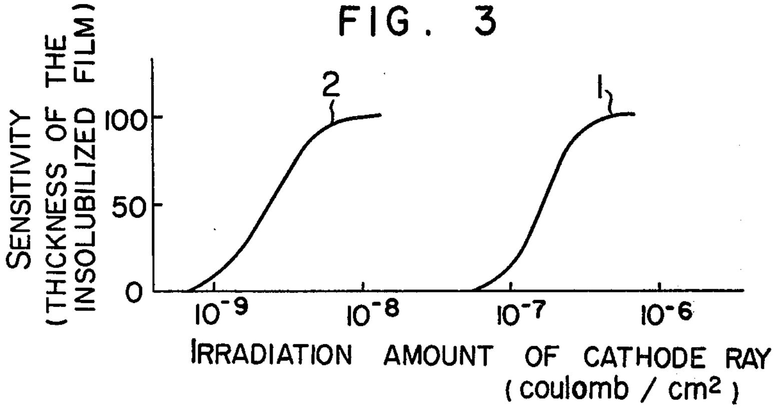

FIG. 3 is an example which shows the case of

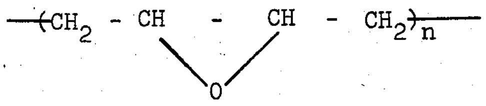

prepared by epoxidizing about one-third of double bonds in the main chain of 1,4-polybutadiene $\text{-}(CH_2-CH=CH-CH_2)_n\text{-}$. Curve 1 is the curve which shows characteristics of the comparative material not epoxidized and Curve 2 is the curve which shows those of the material epoxidized of the present invention. The molecular weights of the both materials are about 330,000.

As is clear from the above-mentioned characteristic curves, the polymer material of the present invention, the polymer main and sub chains of which are epoxidized, are individually more sensitive to cathode ray irradiation than the polymers not epoxidized.

Figure 4:
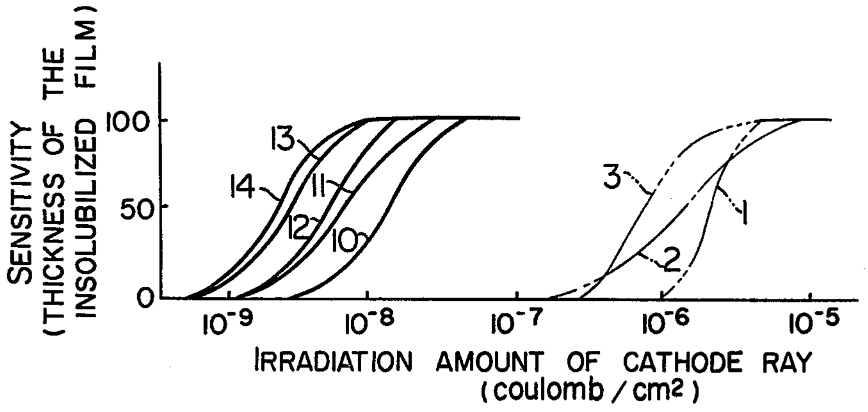

FIG. 4 shows the characteristic curves where sensitivities for cathode ray of the conventional resist composition and that of the present invention are compared with each other. In this figure, curves 1 to 3 shows the characteristics of the conventional resist composition and curves 10 to 14 shows those of the examples of the epoxidized polymers of the present invention. The detailed relationships between the curve number and samples are given in Table 1.

Table 1

| Curve No. | Sample | |
|---|---|---|
| 1 | KPR (trademark of polyvinyl cinnamate produced by Eastman Kodak Co.) | Conventional product |
| 2 | PSR (trademark of cyclic rubber produced by Fuji Yakuhin Kogyo K.K.) | Conventional product |
| 3 | TPR (trademark of polyvinyl cinnamate produced by Tokyo Oka Kogyo K.K.) | Conventional product |
| 10 | glycidylmethacrylate-acrylonitrile copolymer | Product of the present invention |
| 11 | polyglycidylmethacrylate | Product of the present invention |
| 12 | Epoxidized 1,4-polyisoprene | Product of the present invention |
| 13 | Epoxidized 1,2-polybutadiene | Product of the present invention |
| 14 | Epoxidized 1,4-polybutadiene | Product of the present invention |

As is clear from the comparison of curves, the resist materials of the present invention possess excellent characteristics of sensitivity for cathode ray, which the conventional materials do not possess.

That is, in order to obtain a sensitivity of 100, the conventional material requires at least $4 \times 10^{-6}$ coulomb/cm$^2$ or more of irradiation, but the material of the present invention only requires $10^{-8}$ coulomb/cm$^2$ in order to obtain an extremely high sensitivity. If cathode ray-sensitive material is actually used in the production step of the high density memory medium and semiconductor element, the sensitivity must be increased to this extent. Thus the present invention has made the practical use thereof possible.

If the step of the cathode ray irradiation to the resist material of the present invention is traced by infrared spectroscopy, absorption spectra of 820 to 880 cm$^{-1}$, which are characteristic of epoxy group having been presented prior to the irradiation, have disappeared and, instead, absorption spectra, may be due to ether bonds — C — O — C —, have appeared in the vicinity of 1,200 cm$^{-1}$. These spectra suggest that the epoxy groups are opened to involve intermolecular cross-linking and the resist material is insolubilized in a solvent.

Subsequently, the step, where a resist material of the present invention is coated on a substrate to form cathode ray sensitive film and cathode ray is applied to said film, is described in detail.

The coating step varies depending on the molecular weight of the materials to be used. With respect to the material of high molecular weight, for the convenience of coating, undoubtedly it is necessary to control the viscosity of the resist material using such a solvent as methyl ethyl ketone (MEK) or toluene. Such a cathode ray-sensitive material is coated on a substrate to form a coating film and then a narrow beam of cathode ray is applied to the above-mentioned coating film. Subsequently, if the above-mentioned coating film is treated with a developing solution, the non-irradiated portion of the coating film is dissolved and only the irradiated portion of the coating film is cross-linked and insolubilized to complete the developing. The above-mentioned developing solution may be any solutioon if the object of the developing can be attained, but the solvent used in the case of dissolving the above-mentioned cathode ray sensitive materials is generally employed.

Figure 5:
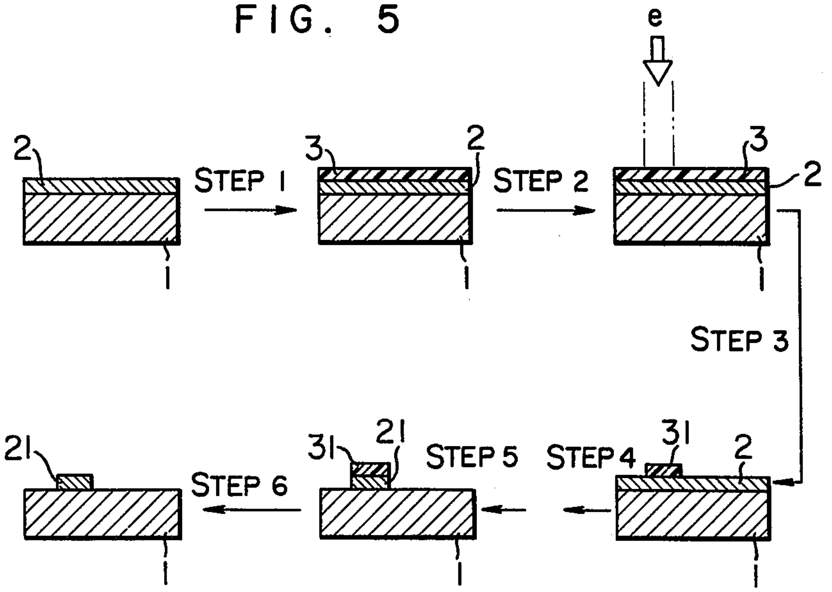

FIG. 5 is a step figure which shows an example where the present invention is applied, to the case of etching in the desired pattern a $SiO_2$ film formed on a semiconductor substrate.

In this Figure, 1 represents semiconductor substrate; 2, $SiO_2$ film; 3, cathode ray-sensitive coating film; *e*, cathode ray generator.

Step 1 is a step of forming a cathode ray-sensitive film on $SiO_2$ layer 2 of semiconductor substrate 1 on which the said $SiO_2$ is placed, in accordance with an already well known method. This step is a step of dissolving a cathode ray-sensitive material (organic polymer) in a solvent such as methyl ethyl ketone or toluene, controlling the viscosity of the thus obtained solution by varying the volume of solvent so that the solution may suit for coating, and coating the solution on $SiO_2$ layer 2.

Step 2 is a step of applying a narrow-beam of cathode ray from generator e to a cathode ray-sensitive coating film 3 coated on $SiO_2$ layer 2 at step 1. At this step, cathode ray can be applied only to the intended desired positions of coating film 3, and thus only the portion of coating film which cathode ray is applied to can be made to be insoluble in a solvent.

Step 3 is a developing step where the portion of coating film which cathode ray is not applied to is dissolved in a solvent (developing solution) to be removed. 31 is a resist image produced at step 3.

Step 4 is the heat treatment step for stabilizing the thus produced resist image 31. The heat treatment is usually carried out at a temperature of 110° to 200°C. for a period of 6 to 60 minutes.

Step 5 is a step of etching $SiO_2$ layer 2 using resist image 31 stabilized at step 4 as a mask. The etching solution is, for example, a mixture of hydrofluoric acid and ammonium fluoride or the like. By treatment of this solution, only the portion of $SiO_2$ layer 21 covered by resist image remains but the other exposed portion $SiO_2$ layer is completely removed.

Step 6 is a step of removing the resist image 31 on the $SiO_2$ layer 21. The resist image is peeled off by ordinary mechanical means or dissolved in a suitable solvent to be removed.

By the treatment of these steps, the $SiO_2$ layer can extremely precisely be etched.

Figure 6:
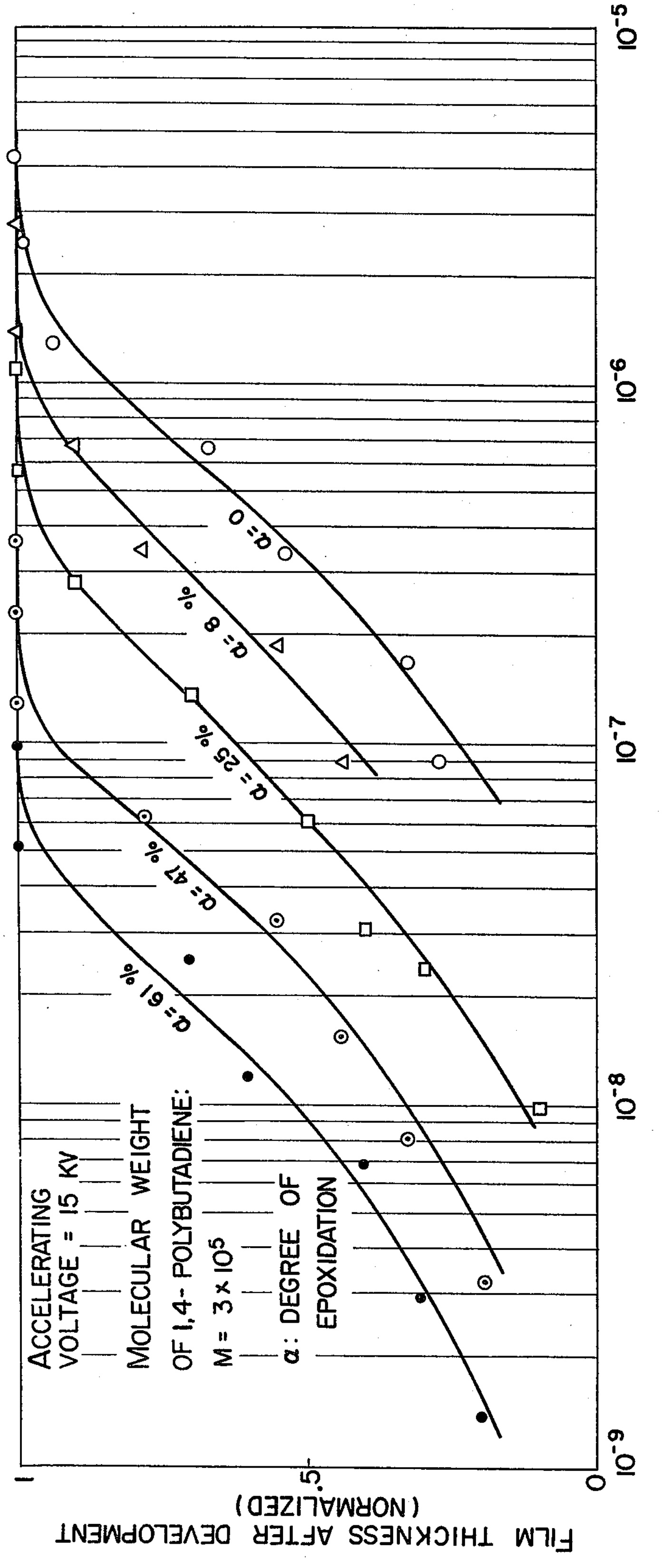

FIG. 6 shows the relationship between the degree of epoxidation and the sensitivity of an epoxidized 1,4-polybutadiene having a molecular weight of 300,000.

Figure 7:
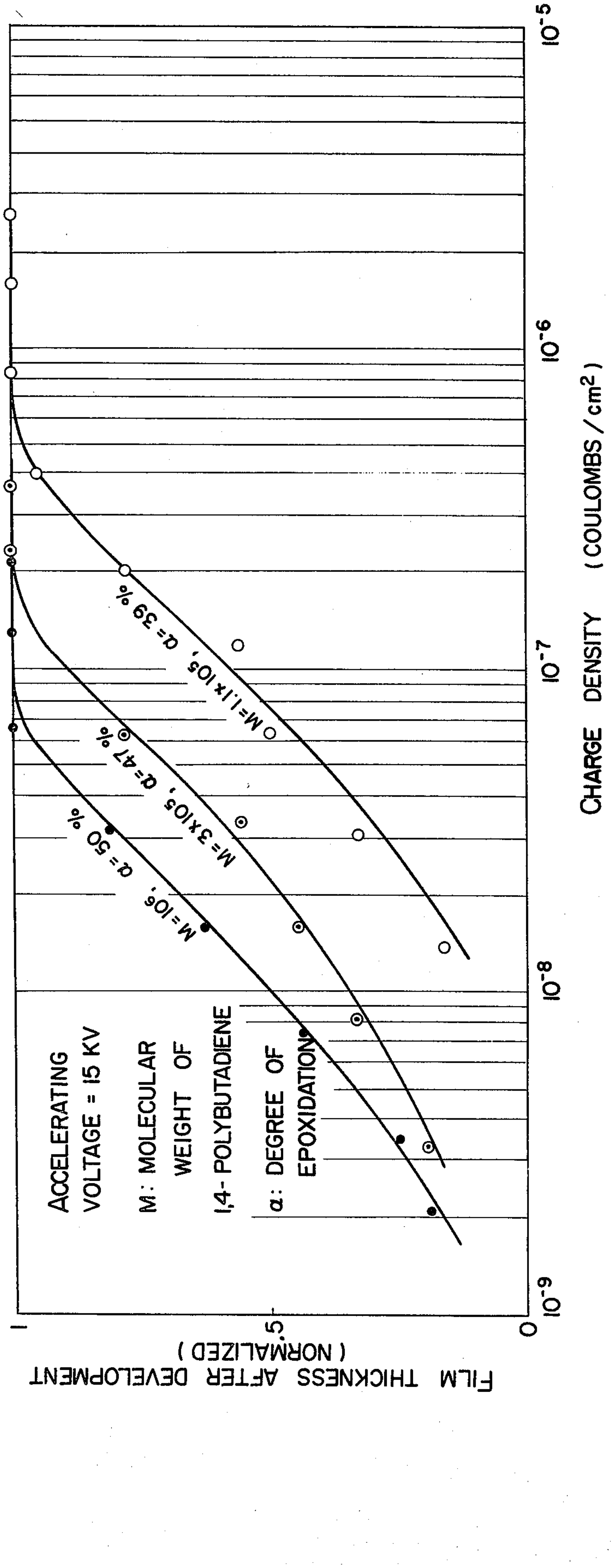
Figure 8:
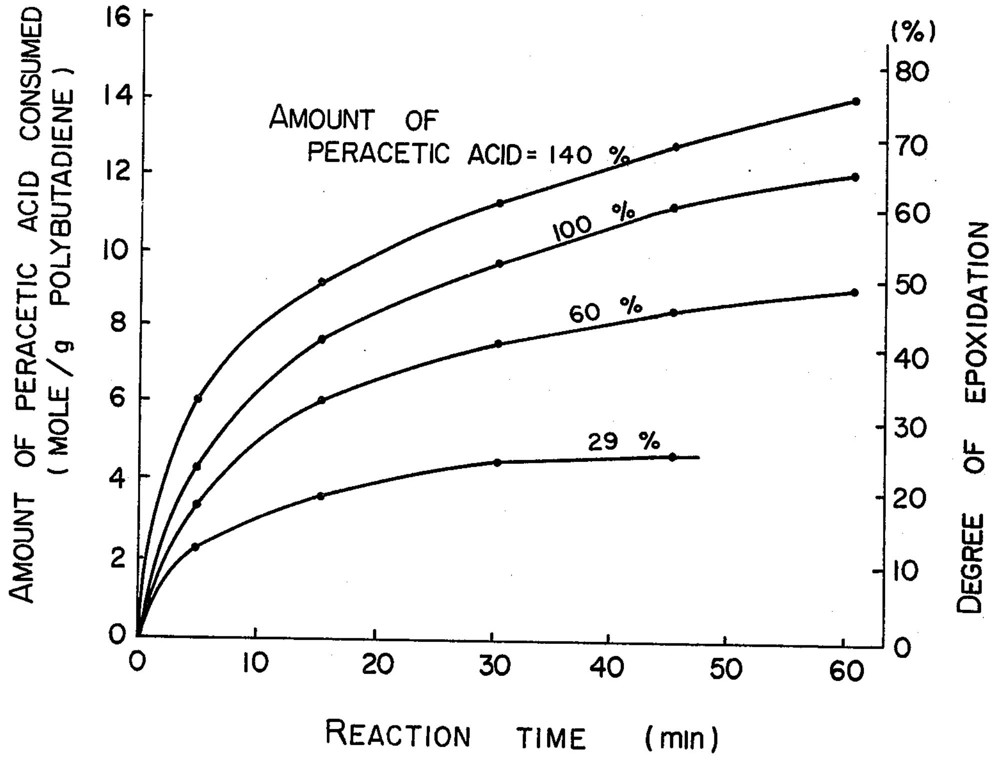

FIG. 7, further shows the relationship between the molecular weight and the cathode ray sensitivity of a 1,4-polybutadiene; and FIG. 8 shows that the amount of peracetic acid consumed and the degree of epoxidation of a 1,4-polybutadiene polymer are interrelated.

As mentioned above, since the resist materials of the present invention in contrast to the conventional materials are not sensitive to visible spectrum or ultraviolet, they not only can be handled and processed with extreme easiness, but also can be prepared with an extreme precision. Thus, they are suitable for semiconductor industry, particularly the production of integrated circuit (IC).

So far, the application of the present invention to the semiconductor industry has mainly described heretofore, but the present resist materials are also efficacious as a memory medium in the memory field for information. That is, since light is not employed as means of writing down but cathode ray of shorter wavelength is employed as the means of memory, high density memory of high molecular unit is theoretically possible. The application of the present resist materials to such a memory medium makes the readout easy, and thus the mixing in advance of such an additive as fluorescent material or other suitable dyes with a photosensitive material is effective.

The effect of the present invention is listed as follows:

1. The sensitivity of the conventional photosensitive material for cathode ray was too weak to be actually used, but the present invention has made the actual use of photosensitive material possible.

2. In the conventional, so to speak, mask method which employs visible light as the sensitizing means, the resolution ability of 1 μ was the critical value. In contrst thereto, in the present invention which employs cathode ray, the resolution ability can principally be promoted to the extent of molecular unit of polymer by scanning a narrow beam of cathode ray in the desired pattern without using any mask. If the present invention is applied in the IC industry, the high density integrated circuit (IC) can be produced. If the present resist material is used, for memory medium the memory at molecular state can be realized so that high density, high performance memory may be undertaken. Therefore an epoch-making memory medium can be obtained.

DESCRIPTION OF THE PREFERRED EMBODIMENTS

The present invention is described in detail by the following examples.

EXAMPLE 1

An example of processing $SiO_2$ layer formed on semiconductor substrate in accordance with the steps in FIG. 5 is described below. At first, an about 4% methyl ethyl ketone (MEK) solution of epoxidized 1,2-polybutadiene (molecular weight: about 300,000; the degree of epoxidation; 45%) was rotary-coated on $SiO_2$ layer of 5000 A thickness formed on Si wafer of 0.3 mm. thickness at the rate of about 3000 r.p.m. so as to form a homogeneous coating film on the $SiO_2$ layer. A cathode ray beam of 15 KV of acceleration voltage was applied onto the thus formed coating film in an irradiation amount of $2 \times 10^{-8}$ coulomb/$cm^2$. Thereafter, the non-irradiated portion was washed with MEK to be dissolved and flowed out, and thus the developing was completed. Thus obtained developed surface was heat-treated at 110°C. for 1 hour, and dipped in a solution mixture of 46% aqueous solution of HF and 41% aqueous solution of $NH_4F$ for 10 minutes to be etched and to remove the portion of $SiO_2$ layer the coating film was not formed on. Thereafter by dissolving and removing the above-mentioned residual coating film, a Si wafer having $SiO_2$ layer on the desired position was obtained.

EXAMPLE 2

A 5% MEK solution of polyglycidyl methacrylate (molecular weight: about 1,700,000; degree of epoxidation equivalent 100%) was rotary-coated on a $SiO_2$ wafer in accordance with the same method as in Example 1 to form a coating film of about 0.15 μ. This polymercoated wafer is placed in a cathode ray processing apparatus, and a narrow cathode ray beam of $10^{-9}$ A beam current and of 20 KV acceleration volt was scanned on the coating film at 1 μ width and 1 μ distance. This processed wafer was taken out of the cathode ray processing apparatus. By washing this wafer with MEK, non-scanned portion of the coating film was dissolved and removed. Thus, memory of 1 μ width and 1 μ distance was obtained. Sensitivity for cathode rays of such a polymer film is shown by curve 11 in FIG. 4.

EXAMPLE 3

A MEK solution of glycidyl methacrylateacrylonitrile copolymer (molecular weight: about 1,100,000; acrylonitrile content: 30%) was coated in a homogeneous thickness of about 0.2 μ on a polyester film on which aluminum had been vaporization-coated. By applying a cathode ray beam of 15 KV acceleration voltage in an irradiation amount of $10^{-7}$ coulomb/$cm^2$ to the thus obtained coating film, only the irradiated portion was insolubilized but the non-irradiated portion was dissolved in MEK to be removed. Thus, a memory medium, the desired portion of which was covered with the polymer was obtained. The sensitivity for cathode ray of the thus produced polymer film is shown by curve 10 in FIG. 4.

EXAMPLE 4

1,4-polybutadiene, the unsaturated positions of which had been epoxidized to the extent of 34%, i.e. the degree of epoxidation is 34% (molecular weight: about 330,000) was dissolved in a mixture of MEK and benzene, and a small amount of Rhodamine 2 B or Thioflavine T as a fluorescent material is added to the above-prepared solution. This polymer solution is rotary-coated at the rate of 4700 r.p.m. on a Si wafer in accordance with the same method as in Example 1, to form a homogeneous coating film. A cathode ray beam of $10^{-9}$ A beam current and 120 KV acceleration voltage was scanned on the thus produced coating film in 1 μ width and 1 μ distance. The cathode ray-irradiated coating film was washed with a mixture of MEK and benzene. By dissolving and removing the non-scanned portion of the coating film, a memory of 1 μ width and 1 μ distance was obtained. The read out for example is carried out by observing the luminescence of fluorescent material caused by scanning cathode ray on the above-mentioned memory medium.

Sensitivity for the cathode ray of the thus obtained polymer film is shown by curve 14 in FIG. 4.

EXAMPLE 5

1,4-polyisoprene with a molecular weight of about 170,000 was epoxidized with an organic peroxide to the extent of 42% of double bonds thereof being epoxidized. When this epoxidized polyisoprene as a cathode ray sensitive polymer was sensitized by cathode ray, sensitivity for cathode ray as represented by curve 12 of FIG. 4 was obtained.

EXAMPLE 6

An example of processing $SiO_2$ layer formed on semiconductor substrate in accordance with the steps in FIG. 5 is described below. At first, an about 4% methyl ethyl ketone (MEK) solution of epoxidized 1,4-polybutadiene (molecular weight: about 300,000; the degree of epoxidation: 61–63%) was rotary-coated on $SiO_2$ layer of 5000 A thickness formed on Si wafer of 0.3 mm. thickness at the rate of about 3000 r.p.m. so as to form a homogeneous coating film on the $SiO_2$ layer. A cathode ray beam of 15 KV of acceleration voltage was applied onto the thus formed coating film in an irradiation amount of $2 \times 10^{-8}$ coulomb/cm$^2$. Thereafter, the non-irradiated portion was washed with MEK to be dissolved and flowed out, and thus the developing was completed. Thus obtained developed surface was heat-treated at 110°C. for 1 hour, and dipped in a solution mixture of 46% aqueous solution of HF and 41% aqueous solution of $NH_4F$ for 10 minutes to be etched and to remove the portion of $SiO_2$ layer the coating film was not formed on. Thereafter by dissolving and removing the above-mentioned residual coating film, a Si wafer having $SiO_2$ layer on the desired position was obtained.

EXAMPLE 7

Chromium was deposited by vacuum evaporation on a glass plate and a benzene chloride solution of an epoxidized 1,4-polybutadiene having a molecular weight of about 1,000,000 and a degree of epoxidation of about 50% was applied in a uniform thickness of about 0.2 to 0.6 micron onto the thus formed chromium layer and then exposed to an electron beam of 1 to $5 \times 10^{-8}$ coulomb/cm$^2$. The thus exposed coating film was subjected to development with methyl isobutyl ketone, whereby an image was formed at only the part exposed to the cathode ray and the unexposed part of the film was dissolved into the developing liquid. The glass plate having the developed surface was dipped in a chromium etching solution to obtain on the glass plate a chromium pattern corresponding to the shape of the coating film on the developed surface.

EXAMPLE 8

Synthesis of epoxidized 1,4-polybutadiene

A commercially available 1,4-polybutadiene having a molecular weight of about 300,000 was reacted with paracetic acid as an epoxidizing agent in an organic solvent for 1,4-polybutadiene, such as toluene, chloroform, chlorobenzene or the like at room temperature to obtain an epoxidized 1,4-polybutadiene.

FIG. 8 shows the results of epoxidation reaction at 20°C. in which the numerical values refer to the ratios of the amounts of peracetic acid actually added to the theoretical amount thereof necessary for complete epoxidation. From FIG. 8, it can clearly be seen that the degree of epoxidation can easily be controlled.

When the present epoxidized 1,4-polybutadiene having a molecular weight of about 300,000 is used as a cathode ray resist, the optimum degree of epoxidation is 61–63%. Further, the representative conditions for obtaining favorable results are as follows:

| | |
|---|---|
| Diluent for epoxidized 1,4-polybutadiene: | Chlorobenzene |
| Thickness of resist film: | 0.2–0.6 micron |
| Cathode ray irradiation: | 1–5 $\times 10^{-8}$ coulomb/cm$^2$<br>Electron Accelerating voltage: 15–20 KV |
| Developing liquid: | Solvent: Methyl isobutyl ketone |

While the novel principles of the invention have been described, it will be understood that various omissions, modifications and changes in these principles may be made by one skilled in the art without departing from the spirit and scope of the invention.

What is claimed is:

1. In a method for forming a cathode ray image comprising:
a. providing a substrate;
b. coating said substrate with a cathode ray-sensitive film consisting essentially of an organic polymer; and
c. exposing at least a portion of said cathode ray-sensitive film to a cathode ray beam to effect cross-linking of the polymer whereby said portion of film is insolubilized with respect to certain organic solvents, the improvement wherein the organic polymer is selected from the group consisting of a diene polymer selected from the group consisting of epozidized 1, 4-polybutadiene, epoxidized 1,4-polyisoprene, epoxidized 1, 4-polychloroprene, and epoxidized 1, 2-polybutadiene, and an epoxy-containing vinyl polymer selected from the group consisting of polyglycidyl methacrylate, polyglycidyl acrylate, a glycidyl methacrylate-acrylonitrile copolymer and a glycidyl acrylate-acrylonitrile copolymer, said organic polymer having a molecular weight of from 100,000 to 10,000,000; the diene polymer having a degree of epoxidation of from 8 to 70%.

2. The method for forming a cathode ray image of claim 1, in which the organic polymer has a molecular weight of 300,000 to 2,000,000.

3. The method for forming a cathode ray image of claim 1, in which the organic polymer is the diene polymer.

4. The method for forming a cathode ray image of claim 1, in which the organic polymer is the epoxycontaining vinyl polymer.

5. In a method for forming a cathode ray image comprising:
a. providing a substrate;
b. coating said substrate with a cathode ray-sensitive film consisting essentially of an organic polymer; and
c. exposing at least a portion of said cathode ray-sensitive film to cathode ray beam to effect cross-linking of said polymer whereby said portion of film is insolubilized with respect to certain organic solvents, the improvement wherein the organic polymer is selected from the group consisting of epoxidized 1, 4-polybutadiene, epoxidized 1, 4-polyisoprene, epoxidized 1,4-polychloroprene and epoxidized 1, 2-polybutadiene, said polymer having a molecular weight of 100,000 to 2,000,000 and a degree of epoxidation of from 25 to 63%.

6. The method for forming a cathode ray image of claim 5, in which the organic polymer consists of epoxidized 1,4-polybutadiene.

7. The method for forming a cathode ray image of claim 5, in which the organic polymer consists of epoxidized 1,4-polyisoprene.

8. The method for forming a cathode ray image of claim 5, in which the organic polymer consists of epoxidized 1,4-polychloroprene.

9. The method for forming a cathode ray image of claim 5, in which the organic polymer consists of epoxidized 1,2-polybutadiene.

10. The method for forming a cathode ray image of claim 6, in which the epoxidized 1,4-polybutadiene is a polymer having a molecular weight of about 330,000 and a degree of epoxidation of about 34%.

11. The method for forming a cathode ray image of claim 7, in which the epoxidized 1,4-polyisoprene is a polymer having a molecular weight of about 170,000 and a degree of epoxidation of about 42%.

12. The method for forming a cathode ray image of claim 5, in which the epoxidized 1,2-polybutadiene is a polymer having a molecular weight of about 300,000 and a degree of epoxidation of about 45%.

13. In a method for forming a cathode ray image comprising:

a. providing a substrate;

b. coating said substrate with a cathode ray-sensitive film; and c. exposing at least a portion of said cathode ray-sensitive film to cathode ray beam to effect cross-linking whereby said portion of film is insolubilized with respect to certain organic solvents, the improvement wherein the cathode ray-sensitive film consists of polyglycidyl methacrylate, polyglycidyl acrylate, glycidyl methacrylate-acrylonitrile copolymer and glycidyl acrylate-acrylonitrile copolymer, said polymer having a molecular weight of 100,000 to 2,000,000.

14. The method for forming a cathode ray image of claim 13, in which the organic polymer consists of a glycidyl methacrylate-acrylonitrile copolymer having a molecular weight of about 1,100,000 and containing about 30 mole percent of acrylonitrile.

15. In a method for forming a resist mask comprising:

a. providing a substrate;

b. coating said substrate with a cathode ray-sensitive film consisting essentially of an organic polymer;

c. exposing at least a portion of said cathode ray-sensitive film to a cathode ray of an irradiation amount of at least $10^{-8}$ coulomb/cm$^2$ in a predetermined pattern leaving at least one unexposed region; and d. removing said at least one unexposed region of said cathode ray-sensitive film by dissolving in a solvent, in which the exposed portion is insoluble thereby forming a resist mask having the predetermined pattern, the improvement wherein the organic polymer is selected from the group consisting of epoxidized 1, 4-polybutadiene, epoxidized 1, 4-polyisoprene, epoxidized 1, 4-polychloroprene, and epoxidized 1, 2-polybutadiene, and an epoxy-containing vinyl polymer selected from the group consisting of polyglycidyl methacrylate, polyglycidyl acrylate, a glycidyl methacrylate-acrylonitrile copolymer and a glycidyl acrylate-acrylonitrile copolymer, said organic polymer having a molecular weight of from 100,000 to 10,000,000; the diene polymer having a degree of epoxidation of from 8 to 70%.

16. The method for forming a resist mask of claim 15, in which the organic polymer has a molecular weight of 300,000 to 2,000,000.

17. The method for forming a resist mask of claim 15, in which the organic polymer comsists of the diene polymer.

18. The method for forming resist mask of claim 15, in which the organic polymer consists of the epoxycontaining vinyl polymer.

19. In a method for forming a resist mask comprising:

a. providing a substrate;

b. coating said substrate with a cathode ray-sensitive film consisting essentially of an organic polymer;

c. exposing at least one portion of said cathode ray-sensitive film to a cathode ray of an irradiation amount of at least $10^{-8}$ coulomb/cm$^2$ in a predetermined pattern leaving at least one unexposed region; and d. removing said at least one unexposed region of said cathode ray-sensitive film by dissolving in a solvent in which the exposed portion is insoluble thereby forming a resist mask having the predetermined pattern, the improvement wherein the organic polymer is selected from the group consisting of epoxidized 1, 4-polybutadiene, epoxidized 1, 4-polyisoprene, epoxidized 1, 4-polychloroprine and epoxidized 1, 2-polybutadiene, said polymer having a molecular weight of 100,000 to 2,000,000 and a degree of epoxidation of from 25 to 63%.

20. The method for forming a resist mask of claim 19, in which the organic polymer consists of epoxidized 1,4-polybutadiene.

21. The method for forming a resist mask of claim 19, in which the organic polymer consists of epoxidized 1,4-polyisoprene.

22. The method for forming a resist mask of claim 19, in which the organic polymer consists of epoxidized 1,4-polychloroprene.

23. The method for forming a resist mask of claim 19, in which the organic polymer consists of epoxidized 1,2-polybutadiene.

24. The method for forming a resist mask of claim 20, in which the epoxidized 1,4-polybutadiene is a polymer having a molecular weight of about 330,000 and a degree of epoxidation of about 34%.

25. The method for forming a resist mask of claim 21, in which the epoxidized 1,4-polyisoprene is a polymer having a molecular weight of about 170,000 and a degree of epoxidation of about 42%.

26. The method for forming a resist mask of claim 23, in which the epoxidized 1,2-polybutadiene is a polymer having a molecular weight of about 300,000 and a degree of epoxidation of about 45%.

27. In a method for forming a resist mask comprising:

a. providing a substrate;

b. coating said substrate with a cathode ray-sensitive film consisting essentially of an organic polymer;

c. exposing at least a portion of said cathode ray-sensitive film to a cathode ray of an irradiation amount of at least $10^{-8}$ coulomb/cm$^2$ in a predetermined pattern leaving at least one unexposed region; and d. removing said at least one unexposed region of said cathode ray-sensitive film by dissolving in a solvent in which the exposed portion is insoluble thereby forming a resist mask having the predetermined pattern, the improvement wherein the organic polymer is selected from the group consisting of polyglycidyl methacrylate, polyglycidyl acrylate, glycidyl methacrylate-acrylonitrile copolymer and glycidyl acrylate-acrylonitrile copolymer, said polymer having a molecular weight of 100,000 to 2,000,000.

28. The method for forming a resist mask of claim 27, in which the organic polymer consists of a glycidyl methacrylate-acrylonitrile copolymer having a molecular weight of about 1,100,000 and containing about 30 mole percent of acrylonitrile.

29. In a method for forming a resist mask on a semiconductor material coated with an insulating layer comprising:

a. providing a semiconductor body having a surface covered by an insulating layer;
b. coating said substrate with a cathode ray-sensitive film consisting essentially of an organic polymer;
c. exposing at least a portion of said cathode ray-sensitive film to a cathode ray in a predetermined pattern leaving at least one unexposed region; and
d. removing said at least one unexposed region of said cathode ray-sensitive film by dissolving in a solvent in which the exposed portion is insoluble thereby forming a resist mask having the predetermined pattern, the improvement wherein the organic polymer is selected from the group consisting of a diene polymer selected from the group consisting of epoxidized 1, 4-polybutadiene, epoxidized 1, 4-polyisoprene, epoxidized 1, 4-polychloroprene and epoxidized 1, 2-polybutadiene and an epoxy-containing vinyl polymer selected from the group consisting of polyglycidyl methacrylate, polyglycidyl acrylate, a glycidyl methacrylate-acrylonitrile copolymer and a glycidyl acrylate-acrylonitrile copolymer, said organic polymer having a molecular weight of from 100,000 to 10,000,000; the diene polymer having a degree of epoxidation of from 8 to 70%.

30. The method for forming a cathode ray image of claim 12, in which the cathode ray beam has an irradiation amount of $2 \times 10^{-8}$ coulomb/cm$^2$.

31. The method for forming a resist mask of claim 15, in which the organic polymer consists of 1, 2polybutadiene having a molecular weight of about 300,000 and a degree of epoxidation of about 45%, and the cathode ray has an irradiation amount of $2 \times 10^{-8}$ coulomb/cm$^2$.

32. The method for forming a resist mask on a semiconductor material of claim 29, in which the organic polymer consists of 1,2 polybutadiene having a molecular weight of about 300,000 and a degree of epoxidation of about 45%, and the cathode ray has an irradiation amount of $2 \times 10^{-8}$ coulomb/cm$^2$.

33. The method for forming a resist mask on a semiconductor material of claim 32, in which the insulating layer consists of a $SiO_2$ layer of 5000 A thickness.

34. The method for forming a resist mask on a semiconductor material of claim 33, in which the removal of the at least one unexposed region of said cathode ray-sensitive film is accomplished by washing the unexposed region with methyl-ethyl ketone.

* * * * *